No. 741,788. PATENTED OCT. 20, 1903.
F. H. GUBER.
RUBBER TIRE JOINT CLOSING MACHINE.
APPLICATION FILED SEPT. 15, 1902.
NO MODEL.
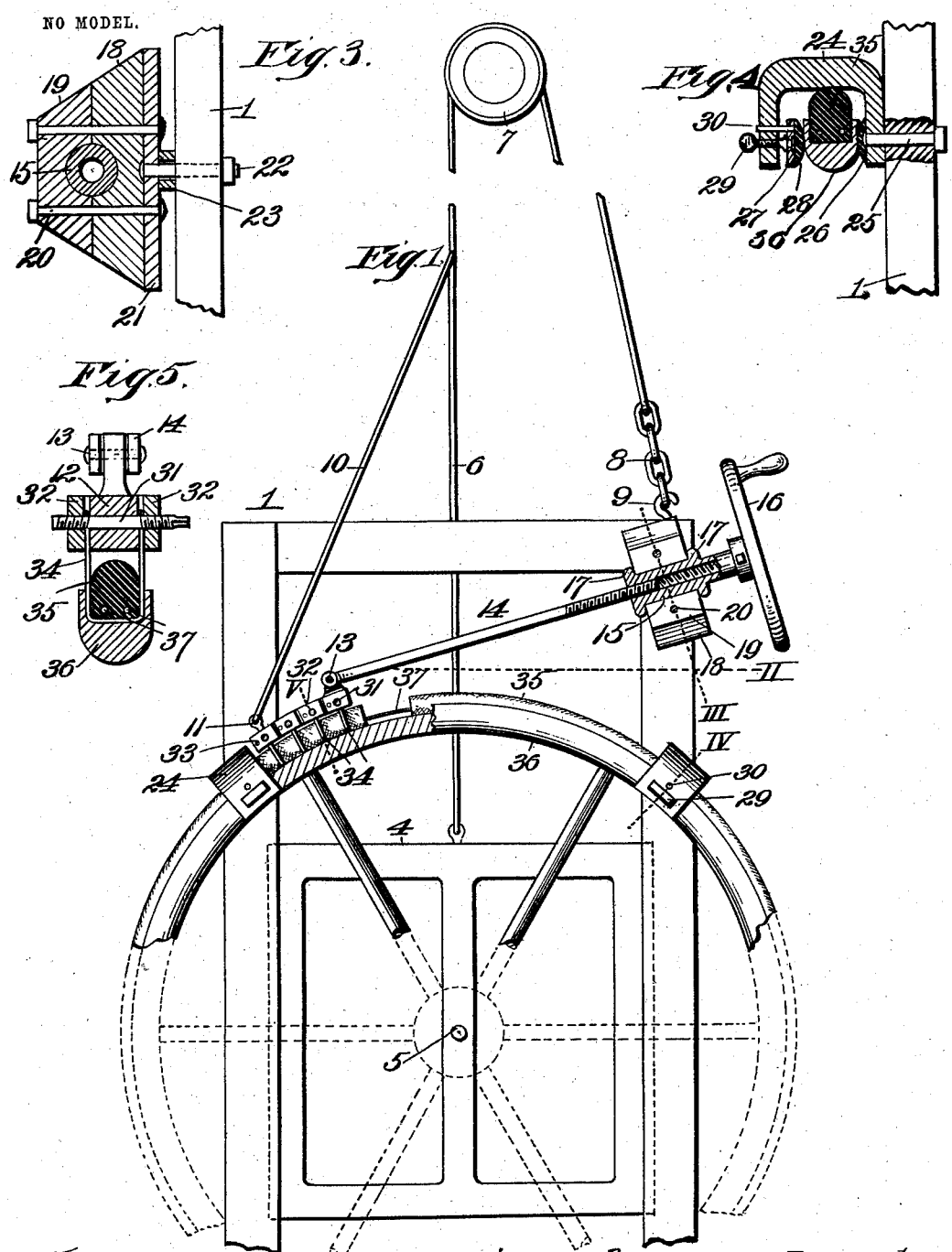
Witnesses:
Inventor:
F. H. Guber.

No. 741,788. Patented October 20, 1903.

UNITED STATES PATENT OFFICE.

FREDERICK H. GUBER, OF KANSAS CITY, MISSOURI, ASSIGNOR TO J. F. MANTER, OF KANSAS CITY, MISSOURI.

RUBBER-TIRE-JOINT-CLOSING MACHINE.

SPECIFICATION forming part of Letters Patent No. 741,788, dated October 20, 1903.

Application filed September 15, 1902. Serial No. 123,389. (No model.)

*To all whom it may concern:*

Be it known that I, FREDERICK H. GUBER, a citizen of the United States, residing at Kansas City, in the county of Jackson and State of Missouri, have invented certain new and useful Improvements in Rubber-Tire-Joint-Closing Machines, of which the following is a specification.

My invention relates to rubber-tire-joint-closing machines; and my object is to produce a machine of this character which performs its functions efficiently and reliably and which can be easily and quickly operated.

A further object is to produce a machine which is of simple, strong, durable, and inexpensive construction.

With these objects in view the invention consists in certain novel and peculiar features of construction and combinations of parts, as hereinafter described and claimed, and in order that it may be fully understood reference is to be had to the accompanying drawings, in which—

Figure 1 is a front view of a machine embodying my invention and showing the same partly in section and as closing the joint of a rubber tire. Fig. 2 is a horizontal section taken on the line II of Fig. 1. Fig. 3 is an enlarged section taken on the line III of Fig. 1. Fig. 4 is an enlarged section taken on the line IV of Fig. 1. Fig. 5 is an enlarged section taken on the line V of Fig. 1.

In the said drawings, 1 designates a frame braced in any suitable manner in a vertical position, so as to be substantially rigid, and 2 parallel angle-plates secured vertically to the back of the frame, so as to provide grooves 3 for a sliding weight 4, said weight having a forwardly-projecting stub-shaft 5 for a purpose which hereinafter appears.

6 designates a cable or chain attached at its lower end to the sliding weight and guided over a pulley 7, suitably supported, and having its opposite end adjustably connected to the frame, preferably by means of a series of links 8, any one of which is adapted to engage the hook 9 on the frame. The connection 6 is provided with a branch 10, connected as at 11 or otherwise to one end of a bar 12, the opposite end of said bar being pivotally connected, as at 13, to a screw 14, said screw engaging the internally-threaded sleeve 15, carrying a hand wheel or crank 16 at its opposite end, so that the rotation of the sleeve shall impart longitudinal movement in one direction or the other to the screw.

To prevent longitudinal movement of the sleeve, it is provided with collars or enlargements 17, disposed at opposite sides of the bearing in which the sleeve is journaled, said bearing consisting of a base-plate 18 and a cap 19, riveted together, as at 20, the rivets extending also through a plate 21, swiveled upon a bolt 22, secured to frame 1, a spacing collar or washer 23 upon the bolt being disposed between the frame and swiveled plate to reduce friction.

A pair of clamps for rigidly holding the wheel being operated each consists of an inverted-U-shaped frame 24, having one arm swiveled upon a bolt 25, said arm forming the stationary jaw of the clamp and having its inner side cushioned, as at 26, to avoid marring the finish of the wheel. The other jaw of the clamp consists of a plate 27, cushioned at its inner side, as at 28, and swiveled upon the inner end of a hand-screw 29, mounted in the outer arm of the U-shaped frame. By turning said screw the movable jaw is advanced toward or withdrawn from the stationary jaw, rotatable action of the movable jaw being prevented by means of a guide-pin 30, secured rigidly to the same and projecting outwardly through the frame, as shown clearly in Figs. 1 and 4.

31 designates a series of rods journaled in bar 12 and having their ends oppositely threaded and engaging the oppositely-threaded clamp-plates 32, so that by turning said threaded rods in one direction or the other the clamp-plates shall be caused to move on guide-pins 33 toward or from the bar and clamp or release the upper ends of a corresponding series of wire clips 34, said wire clips being passed around the under or flat side of the rubber tire 35 of wheel 36, the endless wires 37 extending through the tire in the customary manner, it being understood, of course, that this machine is intended for use after the tire has been compressed and the wires have been brazed.

Assuming now that the tire is being compressed preliminary to the brazing of the wires in the usual manner and by any suitable machinery, (not shown,) the operator, if the joint is to be closed by my machine, slips a plurality of wires, preferably four, under the end of the tire to be compressed and leaves their ends projecting outwardly, so as to form the clips hereinbefore described. To insert the wheel so that the tire-joint may be closed, the operator breaks the connection between the sliding frame and frame 1 by disconnecting the link 8 from hook 9. This permits frame 4 to slide down low enough for the wheel, whatever the size, to be slipped upon the stub-shaft 5. The operator then grasps the connection 6 contiguous to its free end and pulls down upon it until he draws the wheel up into clamps 24, the pressure of the tire against the top of the clamps causing the latter to assume a position concentric of the wheel, it being understood that there is sufficient friction in the swivel of the clamps to prevent them freely swinging down to an inverted position. The operator next engages the proper link 8 with hook 9 to sustain the wheel in such position and then turns hand-screws 29 until the wheel is gripped rigidly between the cushioned jaws of the clamps. He then manipulates the wheel 16 so that the bar 12 can be arranged contiguous to and parallel with the compressed portion of the tire and then bends the ends of the clips 34 slightly around the adjacent rods 31, this action being followed by the manipulation of said rods by means of a wrench, so as to clamp the clips rigidly between plates 32 and bar 12, all of the operations described being performed in a very short time. The operator now grasps the hand wheel or crank 16 and operates it, so as to draw the compressed end of the tire toward the opposite end, and in this connection it will be apparent that the pull is at a tangent to the periphery of the felly, so that there shall be practically no frictional resistance between the action of the compressed end of the tire and the contiguous portion of the felly.

In most cases an imperceptible slippage occurs between the compressed end of the tire and the wires whereby the compressed end shall alone be elongated and no strain be applied on the balance of the tire. Should this slippage not occur, however, the operator after removing part of the compression on the tire may loosen the clip most remote from the hand-wheel, then remove more compression, then loosen the next clip, and so on until the joint is completely closed and the ends of the tire cemented together in the customary manner, and in this connection it will be noticed that by reason of the fact that plate 21 provides a swivel-bearing for the screw and because of the pivotal connection between the latter and bar 12 the varying position which the screw necessarily assumes is automatically accommodated.

Before proceeding with the operation of wheel 16 the branch cable is preferably detached from the clip-carrying clamp and looped out of the way, and after the tire is secured the clips are disengaged from the bar-clamp and drawn from under the tire.

With my machine old tires as well as new can be operated upon without injury and a practically uniform tension be imparted to them to the end that their period of service may be increased.

From the above description it will be apparent that I have produced a rubber-tire-joint-closing machine which embodies the features of advantage enumerated as desirable in the statement of invention, and while I have illustrated and described the preferred embodiment of the same it is to be understood that I reserve the right to make such changes as shall properly fall within the spirit and scope of the invention.

Having thus described the invention, what I claim as new, and desire to secure by Letters Patent, is—

1. In a machine of the character described, a frame, a wheel-carrying weight to slide up and down therein, a cable connecting the weight and frame to hold the former elevated, means to hold the elevated wheel against rotative action, a clamp, a branch of the cable attached to one end of the clamp as a support therefor, and means attached to the opposite end of the clamp to effect adjustment thereof approximately parallel with the periphery of the wheel.

2. In a machine of the character described, a suitable frame, a plate suitably swiveled thereto and carrying a bearing, a threaded sleeve journaled in the bearing, a screw engaging the said sleeve, a clamp pivoted to the opposite end of the screw, a sliding weight carrying the wheel, clips attached to the compressed end of the tire, and to said clamp, and flexible adjustable connection between the weight and a fixed point, a branch of said connection attached to said clamp, and clips carried by the frame for holding the wheel against rotatable action.

In testimony whereof I affix my signature in the presence of two witnesses.

FREDERICK H. GUBER.

Witnesses:
H. C. RODGERS,
G. Y. THORPE.